United States Patent
Suzuki

(10) Patent No.: US 9,912,280 B2
(45) Date of Patent: Mar. 6, 2018

(54) ROTATING ELECTRIC MACHINE CONTROL DEVICE

(71) Applicant: DENSO CORPORATION, Kariya, Aichi-pref. (JP)

(72) Inventor: Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/993,997

(22) Filed: Jan. 12, 2016

(65) Prior Publication Data
US 2016/0204730 A1     Jul. 14, 2016

(30) Foreign Application Priority Data

Jan. 14, 2015   (JP) .................................... 2015-5028

(51) Int. Cl.
| | |
|---|---|
| H02P 21/14 | (2016.01) |
| H02P 29/028 | (2016.01) |
| H02P 27/06 | (2006.01) |
| H02P 29/032 | (2016.01) |

(52) U.S. Cl.
CPC ............ *H02P 29/028* (2013.01); *H02P 21/14* (2013.01); *H02P 27/06* (2013.01); *H02P 29/032* (2016.02)

(58) Field of Classification Search
CPC ...... H02P 29/028; H02P 29/032; H02P 21/14; H02P 27/06

USPC ........................................................ 318/139
See application file for complete search history.

(56) References Cited

U.S. PATENT DOCUMENTS

| | | | |
|---|---|---|---|
| 7,076,340 B1 * | 7/2006 | Inazumi | H02P 21/04 318/700 |
| 2003/0085683 A1 | 5/2003 | Satake et al. | |
| 2011/0074333 A1 | 3/2011 | Suzuki | |
| 2013/0257343 A1 * | 10/2013 | Tachihara | H02P 3/18 318/805 |
| 2013/0285591 A1 | 10/2013 | Suzuki | |
| 2014/0368150 A1 | 12/2014 | Furukawa et al. | |

* cited by examiner

*Primary Examiner* — Kawing Chan
(74) *Attorney, Agent, or Firm* — Knobbe, Martens, Olson & Bear, LLP

(57) ABSTRACT

A rotating electric machine control device includes: an inverter in each winding set of a rotating electric machine having high and low potential-side switching elements corresponding to each phase; and a controller. The controller has: a signal generator of a control signal for turning on and off the high and low potential-side switching elements; a disturbance voltage estimating device calculating a disturbance voltage estimation value of a disturbance voltage, which is generated in a normal system, based on a current flowing in a failure system when the short circuit failure occurs; and a command calculating device calculating a normal system command value in accordance with the disturbance voltage estimation value.

9 Claims, 9 Drawing Sheets

ROTATING ELECTRIC MACHINE CONTROL DEVICE

CROSS REFERENCE TO RELATED APPLICATION

This application is based on Japanese Patent Application No. 2015-5028 filed on Jan. 14, 2015, the disclosure of which is incorporated herein by reference.

TECHNICAL FIELD

The present disclosure relates to a rotating electric machine control device.

BACKGROUND

There has hitherto been known a multi-winding motor control device for controlling, by use of a plurality of inverters, a multi-winding motor which has a plurality of windings in one motor. For example, Patent Literature 1 proposes control in which interference between current control systems of the respective windings is compensated to bring them into a non-interference state.

However, Patent Literature 1 does not describe control in the case of occurrence of a short circuit failure in switching elements that constitute the inverter, for example.

Patent Literature 1: JP 2003-153585 A (corresponding to US 2003/0085683)

SUMMARY

It is an object of the present disclosure to provide a rotating electric machine control device which appropriately controls a drive of a rotating electric machine even when a short circuit failure partially occurs.

According to an aspect of the present disclosure, a rotating electric machine control device for controlling a drive of a rotating electric machine having a plurality of winding sets which are magnetically coupled with each other, includes: an inverter arranged in each of the winding sets and having a high potential-side switching element corresponding to each phase of a respective winding set, and a low potential-side switching element connected to a low potential side of the high potential-side switching element; and a controller controlling the inverter in each of the winding sets. Each of the winding sets and the inverter corresponding to a respective winding set provide a system. The controller has: a signal generator generating a control signal for controlling on and off operations of each of the high potential-side switching elements and the low potential-side switching elements; a disturbance voltage estimating device calculating a disturbance voltage estimation value that is obtained by estimating a disturbance voltage, which is generated in a normal system where a short circuit failure does not occur, based on a current flowing in a failure system when the short circuit failure occurs in the failure system; and a command calculating device calculating a normal system command value, related to a control of energization to the normal system, in accordance with the disturbance voltage estimation value. An upper-side bus connects high potential sides of high potential-side switching elements in each of the winding sets. A lower-side bus connects low potential sides of low potential-side switching elements in each of the winding sets. The short circuit failure is defined as a failure, in which the upper-side bus or the lower-side bus is electrically connected to one phase of a respective winding set.

Accordingly, even when the short circuit failure occurs in some system, the normal system can be controlled without being affected by a current flowing in the failure system, thereby appropriately driving the rotating electric machine by use of the normal system.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, a rotating electric machine control device according to the present disclosure will be described with reference to the drawings. In a plurality of embodiments below, substantially the same configurations will be provided with the same numeral, and a repeated description thereof will be omitted.

(First Embodiment)

Figure 1:
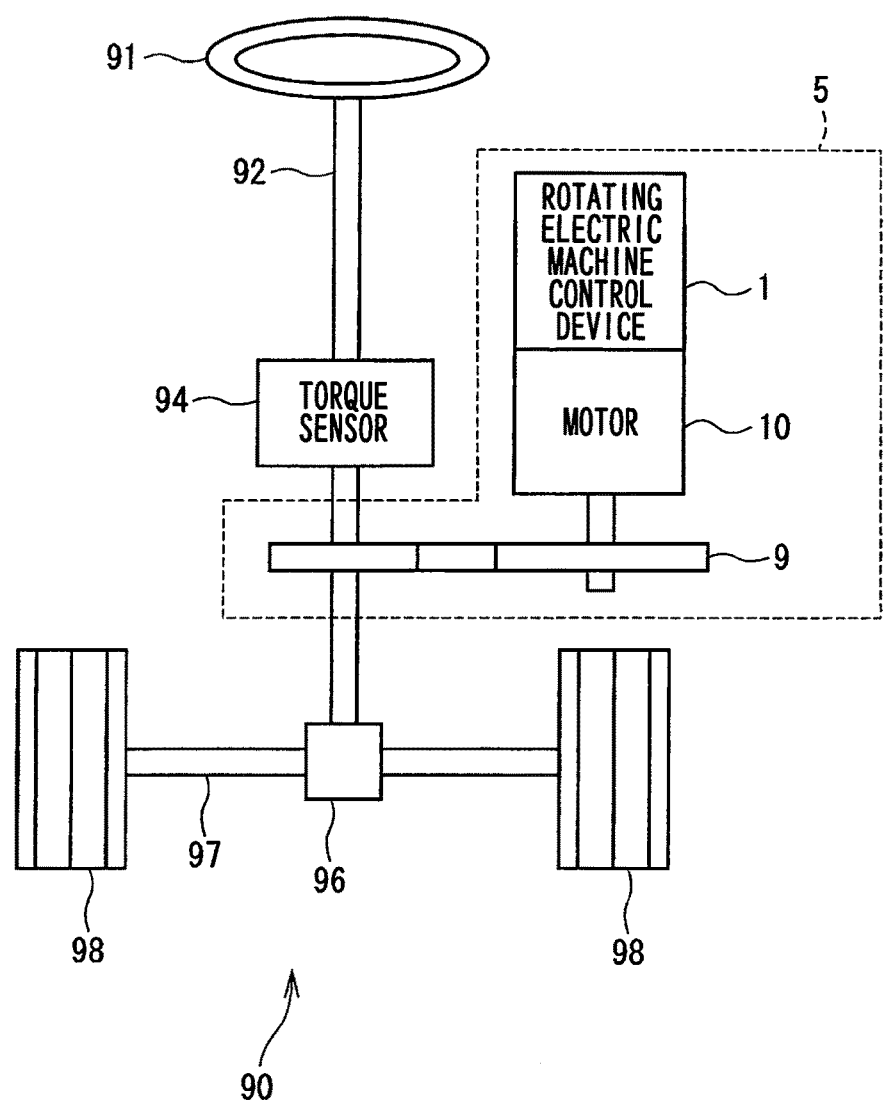
FIG. 1 is a schematic configuration diagram showing an electric power steering device according to a first embodiment of the present disclosure.
Figure 2:
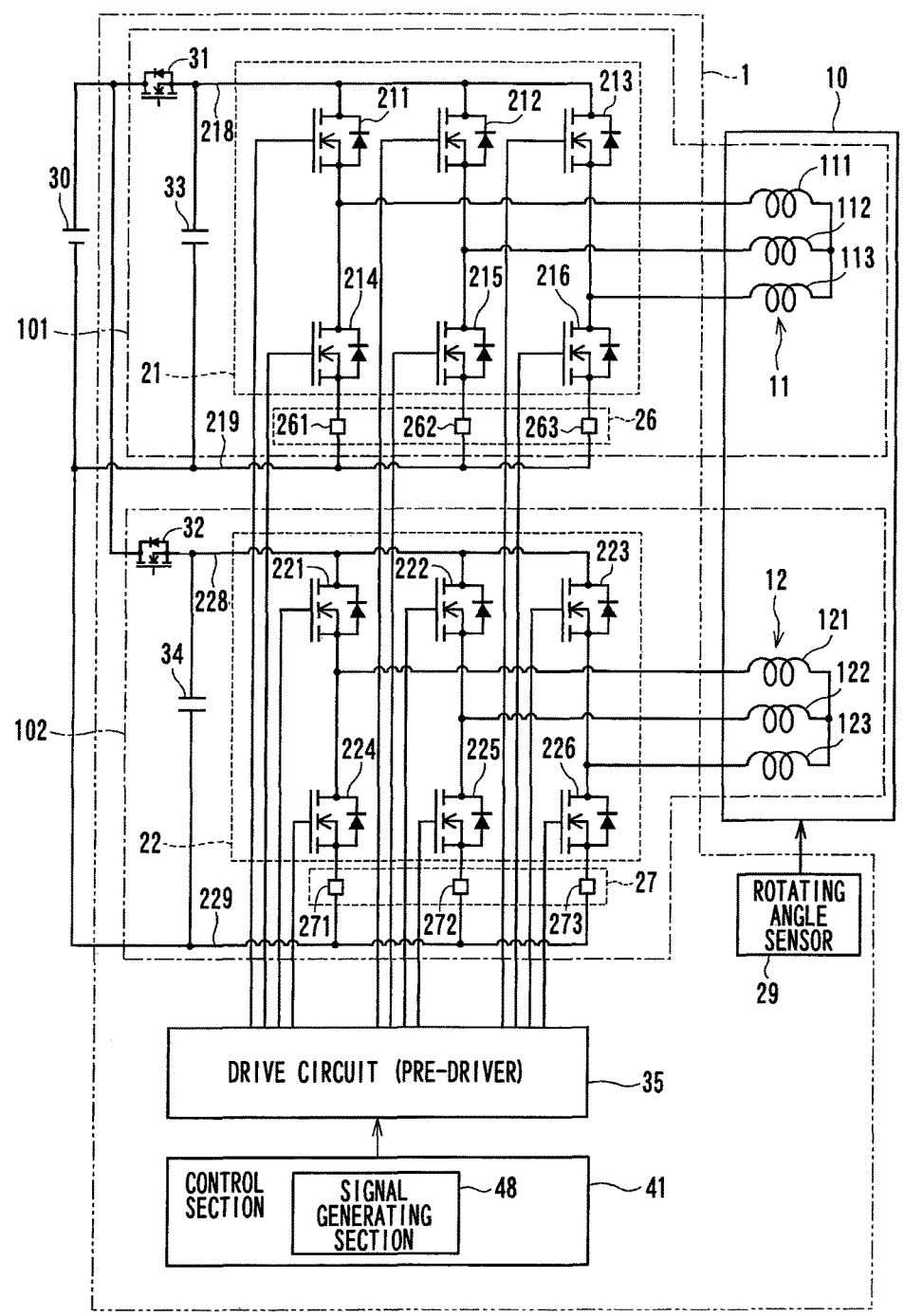
FIG. 2 is a circuit diagram showing a circuit configuration of a rotating electric machine control device according to the first embodiment of the present disclosure.
Figure 3:
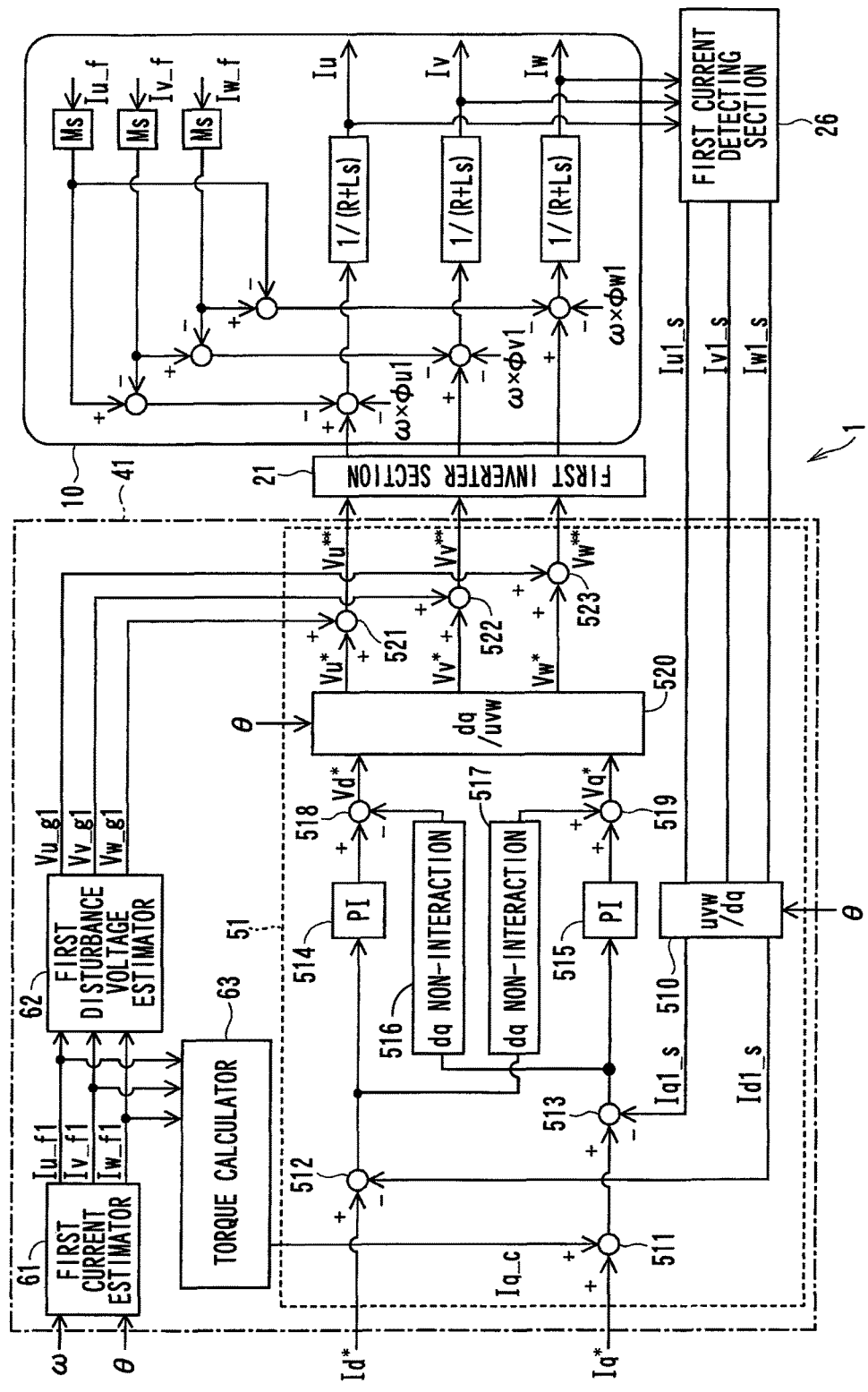
FIG. 3 is a block diagram showing a control section according to the first embodiment of the present disclosure.

FIGS. 1 to 3 show a rotating electric machine control device according to a first embodiment of the present disclosure. A rotating electric machine control device 1 of the present embodiment is applied to an electric power steering device 5 for assisting steering operation by a driver, along with a motor 10 as a rotating electric machine.

FIG. 1 shows an overall configuration of a steering system 90 provided with the electric power steering device 5. The steering system 90 has a steering wheel 91, a steering shaft 92, a pinion gear 96, a rack shaft 97, wheels 98, the electric power steering device 5, and the like.

The steering wheel 91 is connected with the steering shaft 92. The steering shaft 92 is provided with a torque sensor 94 for detecting steering torque which is inputted by the driver operating the steering wheel 91. The pinion gear 96 is provided at the tip of the steering shaft 92, and meshed with the rack shaft 97. A pair of wheels 98 are coupled to respective sides of the rack shaft 97 through tie rods or the like.

Thus, when the driver rotates the steering wheel 91, the steering shaft 92 connected to the steering wheel 91 is rotated. The rotating motion of the steering shaft 92 is converted to linear motion of the rack shaft 97 by the pinion gear 96, and the pair of wheels 98 is steered at an angle in accordance with an amount of displacement of the rack shaft 97.

The electric power steering device 5 is provided with a motor 10 for outputting auxiliary torque for assisting steering of the steering wheel 91 by the driver, the rotating electric machine control device 1 used for controlling drive of the motor 10, a reduction gear 9 for reducing rotation of the motor 10 to transmit the reduced rotation to the steering shaft 92 or the rack shaft 97, and the like.

The motor 10 is supplied with power from a battery 30 (see FIG. 2) as a DC power supply, to rotate the reduction gear 9 forward and backward.

As shown in FIG. 2, the motor 10 is a three-phase brushless motor having a rotor and a stator, neither of which is shown. The rotor is a cylindrical member having a permanent magnet stuck to the surface thereof, and the rotor thus has magnetic poles. Winding sets 11, 12 are wound around the stator.

The first winding set 11 includes a U1 coil 111, a V1 coil 112, and a W1 coil 113. The second winding set 12 includes a U2 coil 121, a V2 coil 122, and a W2 coil 123.

The first winding set 11 and the second winding set 12 are not electrically coupled, but are wound around the same stator, and are magnetically coupled by a magnetic circuit constituted by the motor 10. Further, the U1 coil 111 of the first winding set 11 and the U2 coil 121 of the second winding set 12 are arranged in positions with phases thereof displaced from each other by 30 degrees. This also applies to the V-phase and the W-phase.

The rotating electric machine control device 1 is provided with a first inverter section 21, a second inverter section 22, a first current detecting section 26, a second current detecting section 27, a rotational angle sensor 29, a first power supply relay 31, a second power supply relay 32, a first capacitor 33, a second capacitor 34, a drive circuit (predriver) 35, a control section 41, and the like.

The first inverter section 21 has six switching elements (hereinafter referred to as "SW elements") 211 to 216, and switches conduction to the coils 111, 112, 113 of the first winding set 11.

Drains of the high potential-side SW elements 211, 212, 213 provided on the high potential side are connected to the positive side of the battery 30 through a first upper-side bus 218. Sources of the high potential-side SW elements 211, 212, 213 are connected to drains of the low potential-side SW elements 214, 215, 216 provided on the low potential side. Sources of the low potential-side SW elements 214, 215, 216 are connected to the negative side of the battery 30 through a first lower-side bus 219. Connection points of the high potential-side SW elements 211, 212, 213 and the low potential-side SW elements 214, 215, 216 are respectively connected to one ends of the U1 coil 111, the V1 coil 112, and the W1 coil 113.

The second inverter section 22 has six SW elements 221 to 226, and switches conduction to the coils 121, 122, 123 of the second winding set 12.

Drains of the high potential-side SW elements 221, 222, 223 are connected to the positive side of the battery 30 through a second upper-side bus 228. Sources of the high potential-side SW elements 221, 222, 223 are connected to drains of the low potential-side SW elements 224, 225, 226. Sources of the low potential-side SW elements 224, 225, 226 are connected to the negative side of the battery 30 through a second lower-side bus 229. Connection points of the high potential-side SW elements 221, 222, 223 and the low potential-side SW elements 224, 225, 226 are respectively connected to one ends of the U2 coil 121, the V2 coil 122, and the W2 coil 123.

Each of the SW elements 211 to 216, 221 to 226 of the present embodiment is a MOSFET (Metal-Oxide Semiconductor Field-Effect Transmitter), but it may be an IGBT (Insulated Gate Bipolar Transistor), a thyristor, or the like.

The first current detecting section 26 includes current detection elements 261, 262, 263. The current detection element 261 is provided on the low potential side of the SW element 214, and detects a U1 current Iu1 that is a current to be conducted to the U1 coil 111. The current detection element 262 is provided on the low potential side of the SW element 215, and detects a V1 current Iv1 that is a current to be conducted to the V1 coil 112. The current detection element 263 is provided on the low potential side of the SW element 216, and detects a W1 current Iw1 that is a current to be conducted to the W1 coil 113. A detection value of the current detection element 261 is referred to as a U1 current detection value Iu1_s, a detection value of the current detection element 262 is referred to as a V1 current detection value Iv1_s, and a detection value of the current detection element 263 is referred to as a W1 current detection value Iw1_s.

The second current detecting section 27 includes current detection elements 271, 272, 273. The current detection element 271 is provided on the low potential side of the SW element 224, and detects a U2 current Iu2 that is a current to be conducted to the U2 coil 121. The current detection element 272 is provided on the low potential side of the SW element 225, and detects a V2 current Iv2 that is a current to be conducted to the V2 coil 122. The current detection element 273 is provided on the low potential side of the SW element 226, and detects a W2 current Iw2 that is a current to be conducted to the W2 coil 123.

The current detection elements 261 to 263, 271 to 273 of the present embodiment are shunt resistors.

The rotational angle sensor 29 detects a rotational angle of the motor 10. An electric angle θ of the motor 10, detected by the rotational angle sensor 29, is outputted to the control section 41.

The first power supply relay 31 can cut off power supply from the battery 30 to the first inverter section 21. The second power supply relay 32 can cut off power supply from the battery 30 to the second inverter section 22. The power supply relays 31, 32 are MOSFETs, similarly to the SW elements 211 and the like, but the power supply relays 31, 32 may be IGBTs, mechanical relays, or the like. Further, in the case of using the MOSFET for the power supply relay 31, it is preferable to provide a reverse-connection protection relay, not shown, which is connected in series with each of the power supply relays 31, 32 so as to reverse a direction of a diode in order that, when the battery 30 is erroneously connected in a reverse direction, a current is prevented from flowing in the reverse direction through the diode.

The first capacitor 33 is connected in parallel with the battery 30 and the first inverter section 21. The second capacitor 34 is connected in parallel with the battery 30 and the second inverter section 22. The capacitors 33, 34 store charges, to assist power supply to the inverter sections 21, 22, and reduce a noise component such as a serge current.

In the present embodiment, the first winding set 11, the first inverter section 21 for conduction control of the first winding set 11, the first current detecting section 26, the first power supply relay 31, and the first capacitor 33 are taken as a "first system 101". Further, the second winding set 12, the second inverter section 22 for conduction control of the second winding set 12, the second current detecting section 27, the second power supply relay 32, and the second capacitor 34 are taken as a "second system 102".

The control section 41 controls the overall rotating electric machine control device 1, and is composed of a microcomputer or the like which executes a variety of calculations. Each processing in the control section 41 may be software processing performed by execution of a previously stored program in a CPU, or may be hardware processing performed by means of a dedicated electronic circuit.

The control section 41 has a signal generating section 48. The signal generating section 48 generates a control signal for controlling the on-off of each of the SW elements 211 to 216, 221 to 226 based on the steering torque acquired from the torque sensor 94, the electric angle θ acquired from the rotational angle sensor 29, and the like. The generated control signal is outputted to each of gates of the SW elements 211 to 216, 221 to 226 through a drive circuit (pre-driver) 35.

The control section 41 controls the on-off operation of each of the SW elements 211 to 216, 221 to 226, to control the drive of the motor 10.

Similarly, each of control sections 42 to 45 in embodiments described later has the signal generating section 48. It is to be noted that in FIG. 2, a detailed description of a control configuration has been omitted except for that of the signal generating section 48.

In the second system 102, there may occur a failure in which the second upper-side bus 228 and each phase of the second winding set 12 cannot be electrically disconnected and come into a substantially conductive state. Moreover, there may occur a failure in which the second lower-side bus 229 and each phase of the second winding set 12 cannot be electrically disconnected and come into the substantially conductive state.

The failure, in which the second upper-side bus 228 or the second lower-side bus 229 and each phase of the second winding set 12 cannot be electrically disconnected and come into the substantially conductive state as described above, is referred to as a "short circuit failure". Short circuit failures include element abnormality in which the SW elements 221 to 226 are short-circuited themselves, wiring abnormality in which a short circuit occurs between wires, abnormality of winding, and abnormality of a signal from the control section 41.

In the present embodiment, the first winding set 11 and the second winding set 12 are magnetically coupled. Further, the rotor has a magnet. Accordingly, if the drive of the motor 10 is continued in the first system 101 in the case where the short circuit failure occurs in the second system 102, a current also flows in the second winding set 12 by an induced voltage generated by the drive of the motor 10. This may hinder the control in the first system 101 which is normal. This also applies to a case where the short circuit failure occurs in the first system 101. Hereinafter, a description will be given taking as an example the case of occurrence of the short circuit failure in the second system 102, and a description of the case of occurrence of the short circuit failure in the first system 101 will be omitted. This also applies to the embodiments described later.

Accordingly in the present embodiment, the control section 41 controls a system in which the short circuit failure has not occurred (hereinafter referred to as "normal system") in consideration of an influence of a current flowing in a system in which the short circuit failure has occurred (hereinafter referred to as "failure system"), thereby appropriately driving the motor 10 even when the short circuit failure occurs. Hereinafter, it is assumed that the normal system is the first system 101 and the failure system is the second system 102.

In the present embodiment, it is premised that a phase in which the short circuit failure has occurred is specified based on, for example, terminal voltages or the like of the coils 121 to 123. For example, a phase in which the largest current is detected among the current detection elements 271, 272, 273 can be specified as the phase in which the short circuit failure has occurred, and when the terminal voltage is a substantially power supply voltage (i.e., the terminal voltage is within a predetermined range including a power supply voltage), it is possible to specify that the short circuit failure has occurred in the coil 121, 122 or 123 of the specified phase and the second upper-side bus 228. Further, for example when the terminal voltage is a substantially ground voltage (i.e., the terminal voltage is within a predetermined range including a ground voltage), it is possible to specify that the short circuit failure has occurred in the coil 121, 122 or 123 of the specified phase and the second lower-side bus 229.

FIG. 3 shows a detail of the control section 41. A diagram inside the motor 10 in FIG. 3 shows voltage equations. Details of the voltage equations will be described in the embodiments described later.

A configuration related to control of the first system 101 is described in FIG. 3, and the second system 102 is assumed to have a similar control configuration. When the second system 102 is the failure system, the first system 101 being the normal system is controlled to drive the motor 10. The second inverter section 22 is controlled so as to turn off all of the SW elements 221 to 226 and the second power supply relay 32. That is, the signal generating section 48 generates a control signal for turning off all of the SW elements 221 to 226 and the second inverter section 22. This also applies to second to fifth embodiments.

As shown in FIG. 3, the control section 41 has a command calculating section 51, a first current estimator 61, a first disturbance voltage estimator 62, and a torque calculator 63.

The command calculating section 51 has a three-phase to two-phase conversion section 510, a torque correcting section 511, subtractors 512, 513, controllers 514, 515, dq non-interacting voltage calculating sections 516, 517, non-interacting voltage correcting sections 518, 519, a two-phase to three-phase conversion section 520, and disturbance voltage correcting sections 521, 522, 523. The command calculating section 51 described here calculates a command of the normal system in a case where the short circuit failure has occurred in the failure system, and when the rotating electric machine control device 1 is normal, command calculation is performed in separate processing. This also applies to a command calculating section in each of the embodiments described later.

The three-phase to two-phase conversion section 510 performs dq conversion on the U1 current detection value Iu1_s, the V1 current detection value Iv1_s, and the W1 current detection value Iw1_s, the values being detected by the first current detecting section 26, based on the electric angle θ, to calculate a d-axis current detection value Id1_s and a q-axis current detection value Iq1_s of the first winding set 11. Herein, the d-q axis current detection values Id1_s, Iq1_s are values obtained by simply performing dq conversion on the three-phase current detection values Iu1_s, Iv1_s, Iw1_s. Both of these current detection values are to be included in the concept of the "current detection value", and can be appropriately selected. Similarly, as for a disturbance voltage estimation value and a current estimation value described later, it is appropriately selectable as to whether the three-phase values are used or the d-q axis values are used.

The torque correcting section 511 adds the torque correction value Iq_c, calculated in the torque calculator 63, to a q-axis current command value Iq*, to calculate a corrected q-axis current command value Iq**.

The d-axis subtractor 512 calculates a d-axis current deviation ΔId. The d-axis current deviation ΔId of the present embodiment is a deviation between a d-axis current command value Id* and the d-axis current detection value Id1_s that is fed back.

The q-axis subtractor 513 calculates a q-axis current deviation ΔIq. The q-axis current deviation ΔIq of the present embodiment is a deviation between the corrected q-axis current command value Iq** and the q-axis current detection value Iq1_s that is fed back.

The d-axis controllers 514 calculates a basic d-axis voltage command value Vd*_b by PI calculation or the like such that the d-axis current deviation ΔId is converged to 0.

The q-axis controller 515 calculates a basic q-axis voltage command value Vq*_b by PI calculation or the like such that the q-axis current deviation ΔIq is converged to 0.

The dq non-interacting voltage calculating section 516 calculates a d-axis non-interacting voltage Vd_dc based on the q-axis current deviation ΔIq.

The dq non-interacting voltage calculating section 517 calculates a q-axis non-interacting voltage Vq_dc based on the d-axis current deviation ΔId.

The d-axis non-interacting voltage correcting section 518 subtracts the d-axis non-interacting voltage Vd_dc from the basic d-axis voltage command value Vd*_b, to calculate a d-axis voltage command value Vd*.

The q-axis non-interacting voltage correcting section 519 adds the q-axis non-interacting voltage Vq_dc to the basic q-axis voltage command value Vq*_b, to calculate a q-axis voltage command value Vq*.

The two-phase to three-phase conversion section 520 performs reverse dq conversion on the d-axis voltage command value Vd* and the q-axis voltage command value Vq* based on the electric angle θ, to calculate a U-phase voltage command value Vu*, a V-phase voltage command value Vv*, and a W-phase voltage command value VW*, the value Vv* and the value VW* being values before correction.

The U-phase disturbance voltage correcting section 521 adds a U-phase first disturbance voltage estimation value Vu_g1 to the U-phase voltage command value Vu*, to calculate a corrected U-phase voltage command value Vu**.

The V-phase disturbance voltage correcting section 522 adds a V-phase first disturbance voltage estimation value Vv_g1 to the V-phase voltage command value Vv*, to calculate a corrected V-phase voltage command value Vv**.

The W-phase disturbance voltage correcting section 523 adds a W-phase first disturbance voltage estimation value Vw_g1 to the W-phase voltage command value Vw*, to calculate a corrected W-phase voltage command value Vw**.

The calculated corrected voltage command values Vu, Vv, Vw are outputted to the signal generating section 48 (see FIG. 2). The signal generating section 48 generates a control signal for controlling the on-off of each of the SW elements 211 to 216 based on the corrected voltage command values Vu, Vv, Vw. The generated control signal is outputted to the first inverter section 21 through the drive circuit 35 (see FIG. 2). In FIG. 3, descriptions of the signal generating section 48 and the drive circuit 35 have been omitted. This also applies to FIG. 4 and some other drawings described later.

The first current estimator 61 calculates first current estimation values Iu_f1, Iv_f1, Iw_f1 that are values obtained by estimating failure system currents Iu_f, Iv_f, Iw_f which flow in the failure system by a reverse voltage. The first current estimation values Iu_f1, Iv_f1, Iw_f1 are calculated using circuit equations based on the electric angle θ and a rotational angular velocity ω calculated by time differentiation of the electric angle θ. The first current estimation values Iu_f1, Iv_f1, Iw_f1 may be calculated by map calculation, which uses a previously stored map, in place of the circuit equations.

The first current estimation values Iu_f1, Iv_f1, Iw_f1 are outputted to the first disturbance voltage estimator 62 and the torque calculator 63.

The first disturbance voltage estimator 62 calculates first disturbance voltage estimation values Vu_g1, Vv_g1, Vw_g1 that are values obtained by estimating disturbance voltages Vu_g, Vv_g, Vw_g which are generated in the normal system by the failure system currents Iu_f, Iv_f, Iw_f. The first disturbance voltage estimation values Vu_g1, Vv_g1, Vw_g1 are calculated based on the first current estimation values Iu_f1, Iv_f1, Iw_f1. The first disturbance voltage estimation values Vu_g1, Vv_g1, Vw_g1 are calculated by Expressions (1-1) to (1-3). It is to be noted that M in the expressions is mutual inductance that is generated between the magnetically coupled first winding set 11 and second winding set 12. Further, s in the expressions is a Laplace variable.

$$Vu\_g1 = M \times s \times Iu\_f1 - M \times s \times Iv\_f1 \tag{1-1}$$

$$Vv\_g1 = M \times s \times Iv\_f1 - M \times s \times Iw\_f1 \tag{1-2}$$

$$Vw\_g1 = M \times s \times Iw\_f1 - M \times s \times Iu\_f1 \tag{1-3}$$

The calculated first disturbance voltage estimation values Vu_g1, Vv_g1, Vw_g1 are outputted to the disturbance voltage correcting sections 521, 522, 523.

The torque calculator 63 calculates brake torque Tb which is generated by the first current estimation values Iu_f1, Iv_f1, Iw_f1. The brake torque Tb is calculated by Expression (2). It is to be noted that Kt in the expression is a coefficient for torque conversion.

$$Tb = Iu\_f1 \times Kt \times \sin\theta + Iv\_f1 \times Kt \times \sin(\theta - 120) + Iw\_f1 \times Kt \times \sin(\theta + 120) \tag{2}$$

Further, the torque calculator 63 converts the calculated brake torque Tb to a q-axis current, to calculate the torque correction value Iq_c.

In the present embodiment, the disturbance voltage correcting sections 521, 522, 523 add the first disturbance voltage estimation values Vu_g1, Vv_g1, Vw_g1 to the voltage command values Vu*, Vv*, Vw*. In other words, it can also be said that the command calculating section 51 calculates the corrected voltage command values Vu, Vv, Vw** obtained by compensating the disturbance voltages Vu_g, Vv_g, Vw_g.

Further, the torque correcting section 511 adds the torque correction value Iq_c to the q-axis current command value Iq*. In other words, it can also be said that the command calculating section 51 calculates the corrected voltage command values Vu, Vv, Vw by use of a corrected current command value Iq obtained by compensating the brake torque which is generated by the current flowing in the failure system.

That is, even when the short circuit failure occurs in one system, the corrected voltage command values Vu, Vv, Vw** are calculated by correcting influences of the currents flowing in the failure system, to enable appropriate control of the normal system.

As described in detail above, the rotating electric machine control device 1 of the present embodiment controls the drive of the motor 10 having a plurality of winding sets 11, 12 which are magnetically coupled to each other, and the rotating electric machine control device 1 is provided with the inverter sections 21, 22 and the control section 41.

The inverter sections 21, 22 are provided respectively for the winding sets 11, 12. The first inverter section 21 has the high potential-side SW elements 211 to 213 which are provided corresponding to the respective phases of the first winding set 11, and the low potential-side SW elements 214 to 216 which are respectively connected to the low potential sides of the high potential-side SW elements 211 to 213. The second inverter section 22 has the high potential-side SW elements 221 to 223 which are provided corresponding to the respective phases of the second winding set 12, and the low potential-side SW elements 224 to 226 which are respectively connected to the low potential sides of the high potential-side SW elements 221 to 223.

The control section 41 controls the inverter sections 21, 22. More specifically, the control section 41 controls the on-off operation of each of the SW elements 211 to 216, 221 to 226 of the inverter sections 21, 22.

In the present embodiment, the winding sets 11, 12 and the inverter sections 21, 22 provided corresponding to the winding sets 11, 12 are taken as the "systems". Specifically, the first winding set 11 and the first inverter section 21 are taken as the first system 101, and the second winding set 12 and the second inverter section 22 are taken as the second system 102.

The control section 41 has the signal generating section 48, the first disturbance voltage estimator 62, and the command calculating section 51.

The signal generating section 48 generates a control signal for controlling the on-off operation of each of the high potential-side SW elements 211 to 213, 221 to 223, and the low potential-side SW elements 214 to 216, 224 to 226.

Herein, a failure in which the first upper-side bus 218 for connecting the high potential sides of the high potential-side SW elements 211 to 213, or the first lower-side bus 219 for connecting the low potential sides of the low potential-side SW elements 214 to 216, and any phase of the first winding set 11 come into the conductive state is referred to as a "short circuit failure". Similarly, a failure in which the second upper-side bus 228 for connecting the high potential sides of the high potential-side SW elements 221 to 223, or the second lower-side bus 229 for connecting the low potential sides of the low potential-side SW elements 224 to 226, and any phase of the second winding set 12 come into the conductive state is referred to as a "short circuit failure". It is to be noted that the "conductive state" is not restricted to a completely short-circuited state, but as described above, it includes the state of being conducted to such an extent as not to be electrically disconnected.

Further, a system in which the short circuit failure has occurred is referred to as a "failure system", and a system in which the short circuit failure has not occurred is referred to as a "normal system".

When the short circuit failure has occurred, the first disturbance voltage estimator 62 calculates the first disturbance voltage estimation values Vu_g1, Vv_g1, Vw_g1 that are values obtained by estimating disturbance voltages Vu_g, Vv_g, Vw_g being voltages generated in the normal system by currents flowing in the failure system.

The command calculating section 51 calculates the corrected voltage command values Vu, Vv, Vw** related to conduction to the normal system, in accordance with the first disturbance voltage estimation values Vu_g1, Vv_g1, Vw_g1.

Accordingly, even when the short circuit failure occurs in some system, the normal system can be controlled without being affected by the failure system currents Iu_f, Iv_f, Iw_f, thereby appropriately driving the motor 10 by use of the normal system.

The command calculating section 51 corrects the voltage command values Vu*, Vv*, Vw*, calculated based on the current command values Id*, Iq* related to the drive of the motor 10 and the current detection values Iu1_s, Iv1_s, Iw1_s of the respective phases in the normal system, by the first disturbance voltage estimation values Vu_g1, Vv_g1, Vw_g1, to calculate the corrected voltage command values Vu, Vv, Vw**.

It is thereby possible to more appropriately control the normal system without being affected by the failure system currents Iu_f, Iv_f, Iw_f.

The first disturbance voltage estimation values Vu_g1, Vv_g1, Vw_g1 are calculated based on the rotational angular velocity ω of the motor 10.

Thus, by open-loop control, the disturbance voltages Vu_g, Vv_g, Vw_g can be appropriately estimated by relatively simple calculation.

In the present embodiment, when the short circuit failure occurs, the signal generating section 48 generates a control signal for turning off all of the high potential-side SW elements 221 to 223 and the low potential-side SW elements 224 to 226 of the second inverter section 22 that is the inverter section in the failure system. This can make the disturbance voltages Vu_g, Vv_g, Vw_g as small as possible.

In the present embodiment, the command calculating section 51 corresponds to the "command calculating device", the first disturbance voltage estimator 62 corresponds to the "disturbance voltage estimating device", and the signal generating section 48 corresponds to the "signal generating device". Further, the first disturbance voltage estimation values Vu_g1, Vv_g1, Vw_g1 correspond to the "disturbance voltage estimation values", and the corrected voltage command values Vu, Vv, Vw** correspond to the "normal system command values".

(Second Embodiment)

A second embodiment of the present disclosure will be described with reference to FIG. 4.

A control section 42 of the present embodiment has a command calculating section 53, a second disturbance voltage estimator 71, a bandpass filter 73, a second current estimator 75, and a three-phase to two-phase conversion section 77.

The command calculating section 53 has the three-phase to two-phase conversion section 510, current command value correcting sections 531, 532, subtractors 533, 534, the controllers 514, 515, the dq non-interacting voltage calculating sections 516, 517, the non-interacting voltage correcting sections 518, 519, the two-phase to three-phase conversion section 520, and disturbance voltage correcting sections 541, 542, 543.

The d-axis current command value correcting section 531 adds, to the d-axis current command value Id*, a d-axis second current command value Id_f2 that is a value obtained by performing, in the three-phase to two-phase conversion section 77, dq conversion on second current estimation values Iu_f2, Iv_f2, Iw_f2 estimated in the second current estimator 75, to calculate a corrected d-axis current command value Id**.

The q-axis current command value correcting section 532 adds, to the q-axis current command value Iq*, a q-axis second current command value Iq_f2 that is a value obtained by performing, in the three-phase to two-phase conversion section 77, dq conversion on the second current estimation values Iu_f2, Iv_f2, Iw_f2 estimated in the second current estimator 75, to calculate a corrected q-axis current command value Iq**.

The d-axis subtractor 533 calculates a d-axis current deviation ΔId. The d-axis current deviation Aid of the present embodiment is a deviation between the corrected d-axis current command value Id** and the d-axis current detection value Id1_s that is fed back.

The q-axis subtractor 534 calculates a q-axis current deviation ΔIq. The q-axis current deviation ΔIq of the present embodiment is a deviation between the corrected q-axis current command value Iq** and the q-axis current detection value Iq1_s that is fed back.

The U-phase disturbance voltage correcting section 541 adds a U-phase second disturbance voltage estimation value Vu_g2 to the U-phase voltage command value Vu*, to calculate a corrected U-phase voltage command value Vu**.

The V-phase disturbance voltage correcting section 542 adds a V-phase second disturbance voltage estimation value Vv_g2 to the V-phase voltage command value Vv*, to calculate a corrected V-phase voltage command value Vv**.

The W-phase disturbance voltage correcting section 543 adds a W-phase second disturbance voltage estimation value Vw_g2 to the W-phase voltage command value Vw*, to calculate a corrected W-phase voltage command value Vw**.

The second disturbance voltage estimator 71 calculates second disturbance voltage estimation values Vu_g2, Vv_g2, Vw_g2 that are values obtained by estimating disturbance voltages Vu_g, Vv_g, Vw_g which are generated in the normal system by the failure system currents Iu_f, Iw_f. The second disturbance voltage estimation values Vu_g2, Vv_g2, Vw_g2 are calculated using voltage equations based on the voltage command values Vu*, Vv*, Vw*, the current detection values Iu1_s, Iv1_s, Iw1_s, and the rotational angular velocity ω.

The voltage equations of the three phases of the motor 10 being a multi-winding motor are expressed by Expressions (3-1) to (3-3).

$$Vu1 = R \times Iu1 + Ls \times Iu1 + Ms \times Iu2 - Ms \times Iv2 + \omega \times \phi u1 \quad (3\text{-}1)$$

$$Vv1 = R \times Iv1 + Ls \times Iv1 + Ms \times Iv2 - Ms \times Iw2 + \omega \times \phi v1 \quad (3\text{-}2)$$

$$Vw1 = R \times Iw1 + Ls \times Iw1 + Ms \times Iw2 - Ms \times Iu2 + \omega \times \phi w1 \quad (3\text{-}3)$$

Symbols in the expressions are as follows:
Vu1: voltage of U1 coil 111
Vv1: voltage of V1 coil 112
Vw1: voltage of W1 coil 113
R: resistance
L: self-inductance
M: mutual inductance
ω: electric angular velocity
φu1, φv1, φW1: armature interlinkage flux The disturbance voltages Vu_g, Vv_g, Vw_g are expressed by Expressions (4-1) to (4-3).

$$Vu\_g = M \times s \times Iu\_f \quad (4\text{-}1)$$

$$Vv\_g = M \times s \times Iu\_f \quad (4\text{-}2)$$

$$Vw\_g = M \times s \times Iu\_f \quad (4\text{-}3)$$

Figure 4:
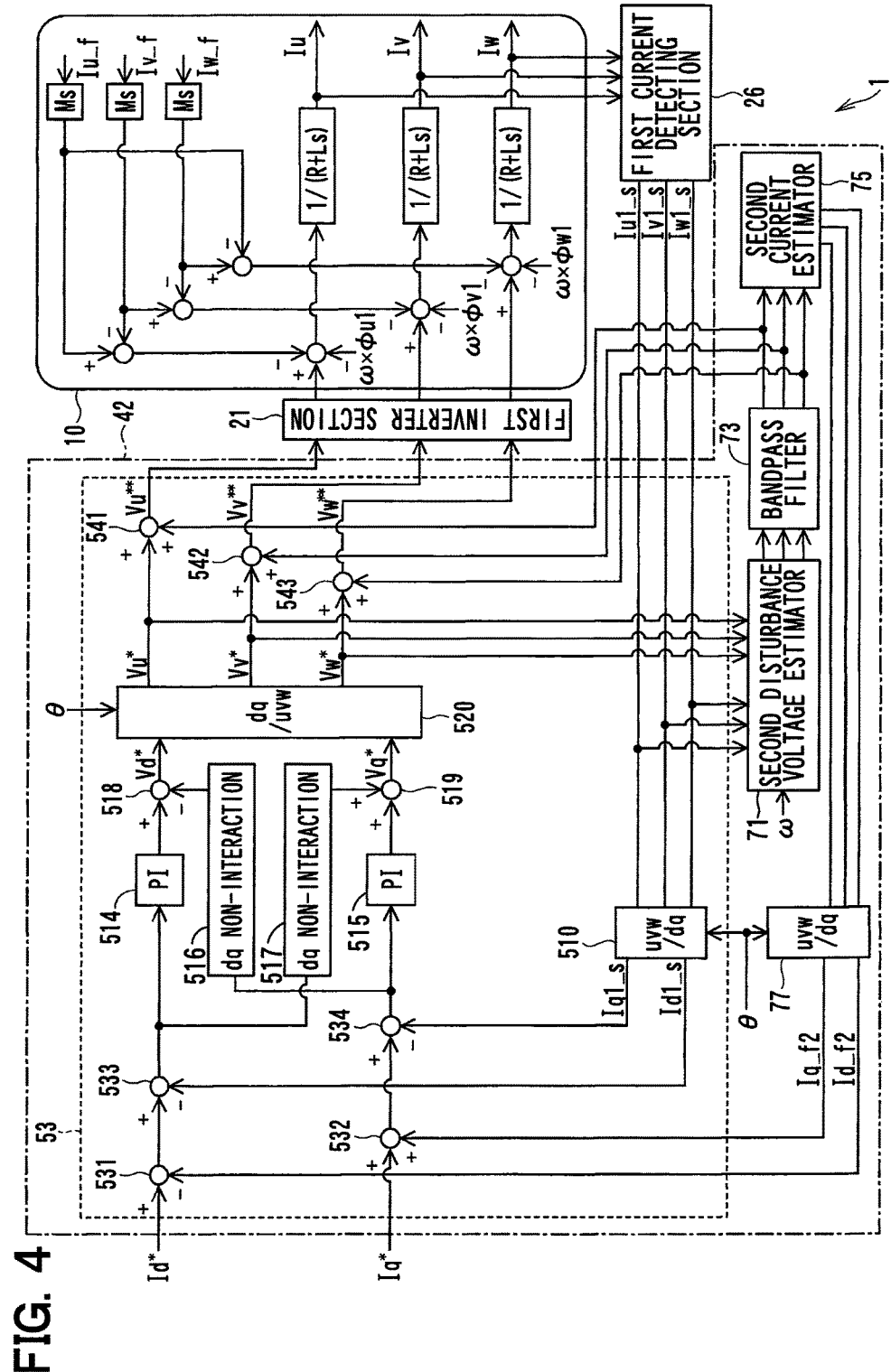
FIG. 4 is a block diagram showing a control section according to a second embodiment of the present disclosure.

It is to be noted that in the motor 10 of FIG. 4, Expressions (3-1) to (3-3) and Expressions (4-1) to (4-3) are represented by a diagram. This also applies to FIG. 5 and the like.

Further, the second disturbance voltage estimation values Vu_g2, Vv_g2, Vw_g2 can be calculated by Expressions (5-1) to (5-3) from the voltage command values Vu*, Vv*, Vw*, the current detection values Iu1_s, Iv1_s, Iw1_s, and the rotational angular velocity ω.

$$Vu\_g2 = Vu^* - (R \times Iu1\_s + L \times s \times Iu1\_s + \omega \times \phi u1) \quad (5\text{-}1)$$

$$Vr\_g2 = Vv^* - (R \times Iv1\_s + L \times s \times Iv1\_s + \omega \times \phi v1) \quad (5\text{-}2)$$

$$Vw\_g2 = Vw^* - (R \times Iw1\_s + L \times s \times Iw1\_s + \omega \times \phi w1) \quad (5\text{-}3)$$

The second disturbance voltage estimation values Vu_g2, Vv_g2, Vw_g2 estimated in the second disturbance voltage estimator 71 include an influence of temperature characteristics, a current detection error, a noise, and an output voltage error. Accordingly, in the present embodiment, the bandpass filter 73 is applied so as to reduce influences of the detection error and the like as described above. Hence it is possible to take out the second disturbance voltage estimation values Vu_g2, Vv_g2, Vw_g2 with a desired frequency component. The frequency characteristics of the bandpass filter 73 can be made variable in accordance with the electric angular velocity. This also applies to a bandpass filter 74 described later. Hereinafter, values outputted from the bandpass filter 73 are simply referred to as "second disturbance voltage estimation values Vu_g2, Vv_g2, Vw_g2".

The second disturbance voltage estimation values Vu_g2, Vv_g2, Vw_g2 outputted from the bandpass filter 73 are added to the voltage command values Vu*, Vv*, Vw* in the disturbance voltage correcting sections 541, 542, 543, to calculate the corrected voltage command values Vu, Vv, Vw**.

The second current estimator 75 calculates second current estimation values Iu_f2, Iv_f2, Iw_f2 that are values obtained by estimating the failure system currents Iu_f, Iv_f, Iw_f. The second current estimation values Iu_f2, Iv_f2, Iw_f2 are calculated based on the second disturbance voltage estimation values Vu_g2, Vv_g2, Vw_g2. The second current estimation values Iu_f2, Iv_f2, Iw_f2 can be calculated from Expressions (7-1), (7-2), (7-3) on the premise of Expression (6).

$$Iu\_f2 + Iv\_f2 + Iw\_f2 = 0 \quad (6)$$

$$Iu\_f2 = (Vu\_g - Vw\_g)/(3 \times M \times s) \quad (7\text{-}1)$$

$$Iv\_f2 = (Vv\_g - Vu\_g)/(3 \times M \times s) \quad (7\text{-}2)$$

$$Iw\_f2 = (Vw\_g - Vv\_g)/(3 \times M \times s) \quad (7\text{-}3)$$

In the present embodiment, the second disturbance voltage estimation values Vu_g2, Vv_g2, Vw_g2 and the second current estimation values Iu_f2, Iv_f2, Iw_f2 are calculated by the three-phase model, thereby eliminating the need to consider interference between the d-q axes. Further, using a three-phase sum=0 as shown in Expression (6) simplifies the calculation.

The estimated second current estimation values Iu_f2, Iv_f2, Iw_f2 are subjected to dq conversion in the three-phase to two-phase conversion section 77. The second current estimation values Id_f2, Iq_f2 calculated in the three-phase to two-phase conversion section 77 are outputted to the current command value correcting sections 531, 532.

In the present embodiment, the second disturbance voltage estimation values Vu_g2, Vv_g2, Vw_g2 are calculated based on the current detection values Iu1_s, Iv1_s, Iw2_s of the respective phases in the normal system, and the voltage command values Vu*, Vv*, Vw* calculated based on the current command values Id*, Iq* related to the drive of the motor 10 and the current detection values Iu1_s, Iv1_s, Iw2_s.

This enables appropriate estimation of the disturbance voltages Vu_g, Vv_g, Vw_g by use of the current detection values Id1_s, Iq1_s in the normal system without specifying a failed phase.

The control section 42 has the second current estimator 75.

The second current estimator 75 calculates second current estimation values Iu_f2, Iv_f2, Iw_f2 that are values obtained by estimating the failure system currents Iu_f, Iv_f, Iw_f which are currents that flowing in the failure system based on the second disturbance voltage estimation values Vu_g2, Vv_g2, Vw_g2.

This enables appropriate estimation of the failure system currents Iu_f, Iw_f based on the second disturbance voltage estimation values Vu_g2, Vv_g2, Vw_g2 calculated based on the current detection values Iu1_s, Iv1_s, Iw1_s in the normal system.

The command calculating section 53 calculates the corrected voltage command values Vu, Vv, Vw based on corrected current detection values Id, Iq** obtained by correcting the current command values Id*, Iq* by the second current estimation values Id_f2, Iq_f2.

Hence, it is possible to compensate brake torque, caused by the failure system currents Iu_f, Iv_f, Iw_f, in the normal system so as to reduce variation in torque when both systems are summed up.

Further, a similar effect to those of the above embodiments is exerted.

In the present embodiment, the command calculating section 53 corresponds to the "command calculating device", the second disturbance voltage estimator 71 corresponds to the "disturbance voltage estimating device", and the second current estimator 75 corresponds to the "current estimating device". Further, the second disturbance voltage estimation values Vu_g2, Vv_g2, Vw_g2 correspond to the "disturbance voltage estimation values", and the three-phase second current estimation values Iu_f2, Iv_f2, Iw_f2 and the d-q axis second current estimation values Id_f2, Iq_f2 correspond to the "current estimation values". The others are similar to those in the above embodiments.

(Third Embodiment)

A third embodiment of the present disclosure will be described with reference to FIG. 5. A difference is that d-q axis voltage equations are used in the present embodiment, while the three-phase voltage equations are used in the second embodiment. The d-q axis model is used in place of the three-phase model, which allows reduction in number of arithmetic expressions.

Figure 5:
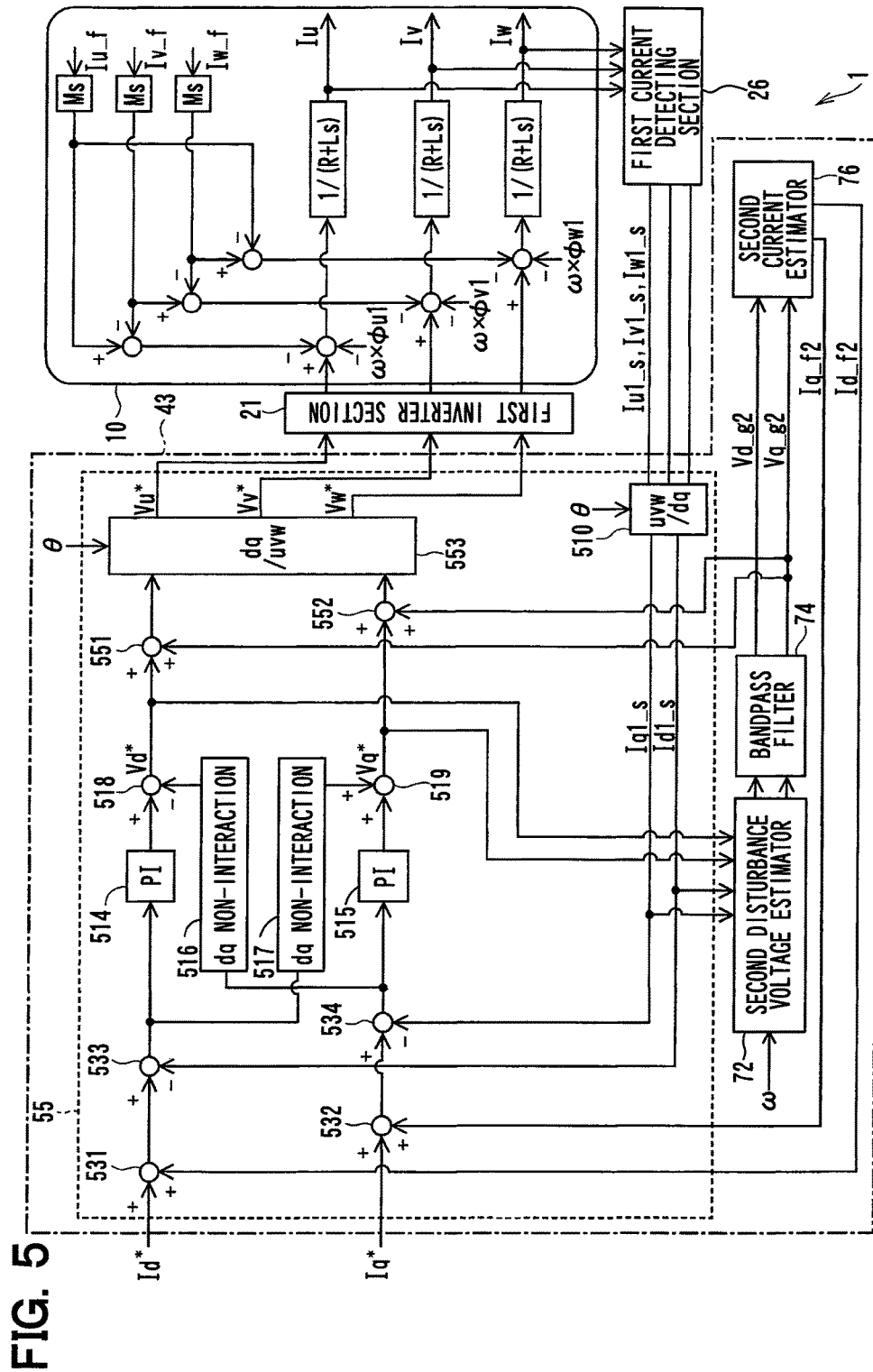
FIG. 5 is a block diagram showing a control section according to a third embodiment of the present disclosure.

As shown in FIG. 5, a control section 43 has a command calculating section 55, a second disturbance voltage estimator 72, the bandpass filter 74, and a second current estimator 76.

The command calculating section 55 has the three-phase to two-phase conversion section 510, the current command value correcting sections 531, 532, the subtractors 533, 534, the controllers 514, 515, the dq non-interacting voltage calculating sections 516, 517, the non-interacting voltage correcting sections 518, 519, disturbance voltage correcting sections 551, 552, and a two-phase to three-phase conversion section 553.

The d-axis disturbance voltage correcting section 551 adds a second disturbance voltage estimation value Vd_g2 to the d-axis voltage command value Vd*, to calculate a corrected d-axis voltage command value Vd**.

The q-axis disturbance voltage correcting section 552 adds a second disturbance voltage estimation value Vq_g2 to the q-axis voltage command value Vq*, to calculate a corrected q-axis voltage command value Vq**.

The two-phase to three-phase conversion section 553 performs reverse dq conversion on the corrected d-axis voltage command value Vd and the corrected q-axis voltage command value Vq based on the electric angle θ, to calculate a U-phase voltage command value Vu*, a V-phase voltage command value Vv*, and a W-phase voltage command value Vw*. The signal generating section 48 generates a control signal based on the voltage command values Vu*, Vv*, Vw* in place of the corrected voltage command values Vu, Vv, Vw**. This also applies to a fifth embodiment described later.

The second disturbance voltage estimator 72 calculates second disturbance voltage estimation values Vd_g2, Vq_g2 that are values obtained by estimating d-q axis disturbance voltages Vd_g, Vq_g which are generated in the normal system by the failure system currents Iu_f, Iw_f. The second disturbance voltage estimation values Vd_g2, Vq_g2 are calculated using voltage equations based on the voltage command values Vd*, Vq*, the current detection values Id1_s, Iq1_s obtained by performing dq conversion in the three-phase to two-phase conversion section 510, and the rotational angular velocity ω.

The voltage equations of the d-q axis of the motor 10 being the multi-winding motor are expressed by Expressions (8-1), (8-2). Further, Vd1 in the expression is a d-axis voltage of the first winding set 11, and Vq1 in the expression is a q-axis voltage of the first winding set 11. Moreover, Id1 in the expressions is a d-axis current of the first winding set 11, and Iq1 in the expressions is a q-axis current of the first winding set 11.

$$Vd1 = R \times Id1 + Ls \times Id1 - \omega \times L \times Iq1 + Ms \times Id2 - \omega \times M \times Iq2 \quad (8\text{-}1)$$

$$Vq1 = R \times Iq1 + Ls \times Iq1 + \omega \times L \times Id1 + Ms \times Iq2 + \omega \times M \times Id2 + \omega \times \phi1 \quad (8\text{-}2)$$

The d-q axis disturbance voltages Vd_g, Vq_g are expressed by Expressions (9-1), (9-2).

$$Vd\_g = Ms \times Id\_f - \omega \times M \times Iq\_f \quad (9\text{-}1)$$

$$Vq\_g = Ms \times Iq\_f + \omega \times M \times Id\_f \quad (9\text{-}2)$$

Further, the disturbance voltage estimation values Vd_g2, Vq_g2 can be calculated by Expressions (10-1), (10-2) from the voltage command values Vd*, Vq*, the current detection values Id1_s, Iq1_s, and the rotational angular velocity ω.

$$Vd\_g2 = Vd^* - (R \times Id1\_s + Ls \times Id1\_s - \omega \times L \times Iq1\_s) \quad (10\text{-}1)$$

$$Vq\_g2 = Vq^* - (R \times Iq1\_s + Ls \times Iq1\_s + \omega \times L \times Id1\_s + \omega \times \phi) \quad (10\text{-}2)$$

Since the disturbance voltage estimation values Vd_g2, Vq_g2 estimated in the disturbance voltage estimator 72 include similar errors to those in the second embodiment, the bandpass filter 74 is applied to take out desired frequency components. Hereinafter, values outputted from the bandpass filter 74 are simply referred to as "disturbance voltage estimation values Vd_g2, Vq_g2".

The disturbance voltage estimation values Vd_g2, Vq_g2 outputted from the bandpass filter 74 are added to the voltage command values Vd*, Vq* in the disturbance voltage correcting sections 551, 552. Corrected voltage command values Vd*, Vq* are then calculated.

The second current estimator 76 calculates second current estimation values Id_f2, Iq_f2 that are values obtained by estimating failure system currents Id_f, Iq_f. Second current estimation values Id_f2, Iq_f2 are calculated based on the second disturbance voltage estimation values Vd_g2, Vq_g2. The second current estimation values Id_f2, Iq_f2 can be calculated from Expressions (11-1), (11-2), by solving simultaneous equations of Expressions (10-1), (10-2).

$$Id\_f2 = (-\omega \times M \times Vd\_g2 + M \times s \times Vq\_g2)/(M^2 \times s^2 + \omega^2 \times M^2) \quad (11\text{-}1)$$

$$Iq\_f2 = (\omega \times M \times Vq\_g2 + M \times s \times Vd\_g2)/(M^2 \times s^2 + \omega^2 \times M^2) \quad (11\text{-}2)$$

The estimated d-q axis second current estimation values Id_f2, Iq_f2 are outputted to the current command value correcting sections 531, 532. In the present embodiment, since the d-q axis second current estimation values Id_f2, Iq_f2 are calculated in the second current estimator 76, it is possible to omit the three-phase to two-phase conversion section 77 provided in the second embodiment, so as to simplify the control configuration.

The present embodiment exerts a similar effect to that of the second embodiment.

In the present embodiment, the command calculating section 55 corresponds to the "command calculating device", the second disturbance voltage estimator 72 corresponds to the "disturbance voltage estimating device", and the second current estimator 76 corresponds to the "current estimating device". Further, the second disturbance voltage estimation values Vd_g2, Vq_g2 correspond to the "disturbance voltage estimation values", the second current estimation values Id_f2, Iq_f2 correspond to the "current estimation values", and the voltage command values Vu*, Vv*, Vw* correspond to the "normal system command values". The others are similar to those in the above embodiments.

(Fourth Embodiment)

A fourth embodiment of the present disclosure will be described with reference to FIGS. 6 and 7.

Figure 6:
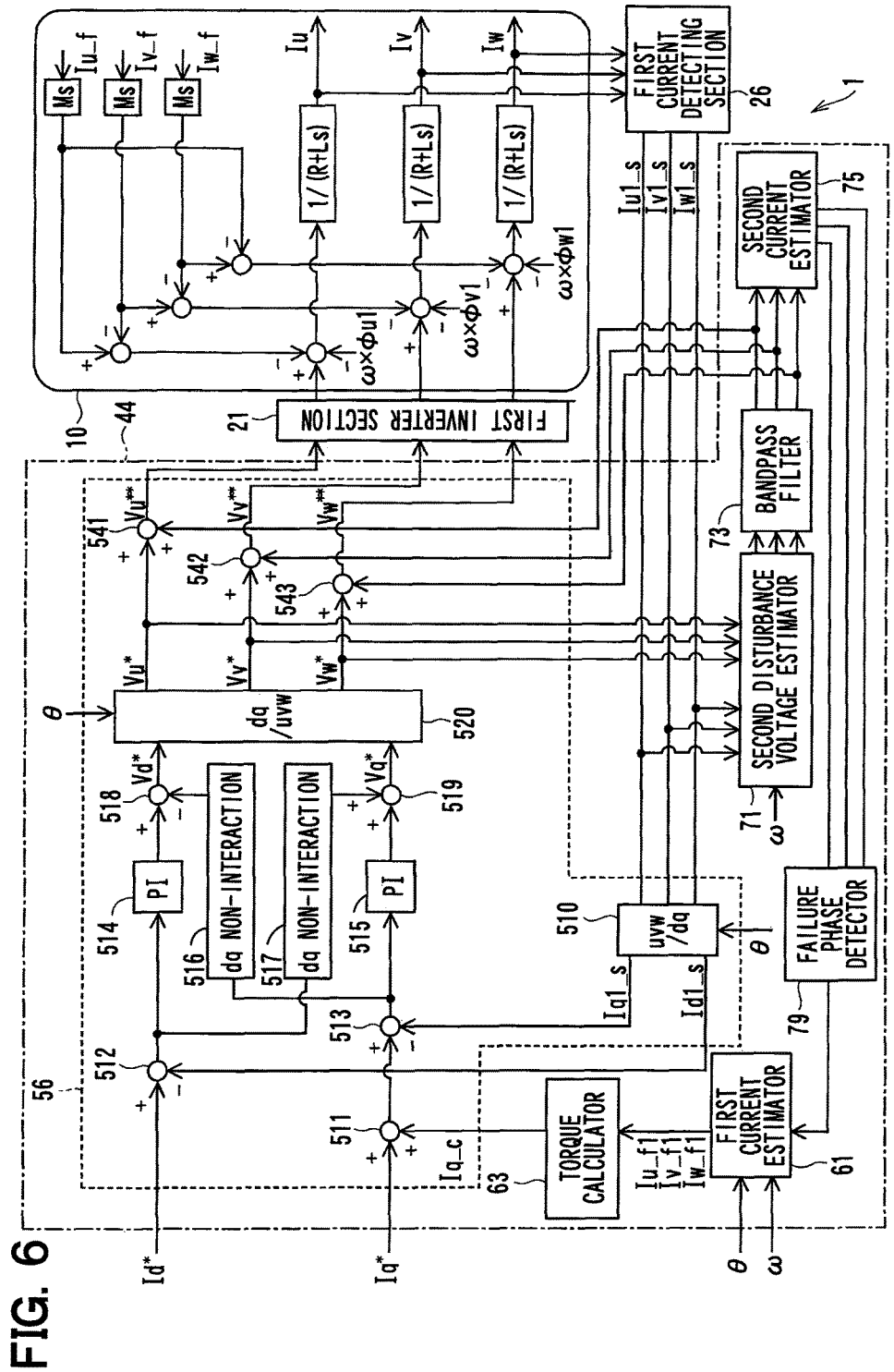
FIG. 6 is a block diagram showing a control section according to a fourth embodiment of the present disclosure.
Figure 7:
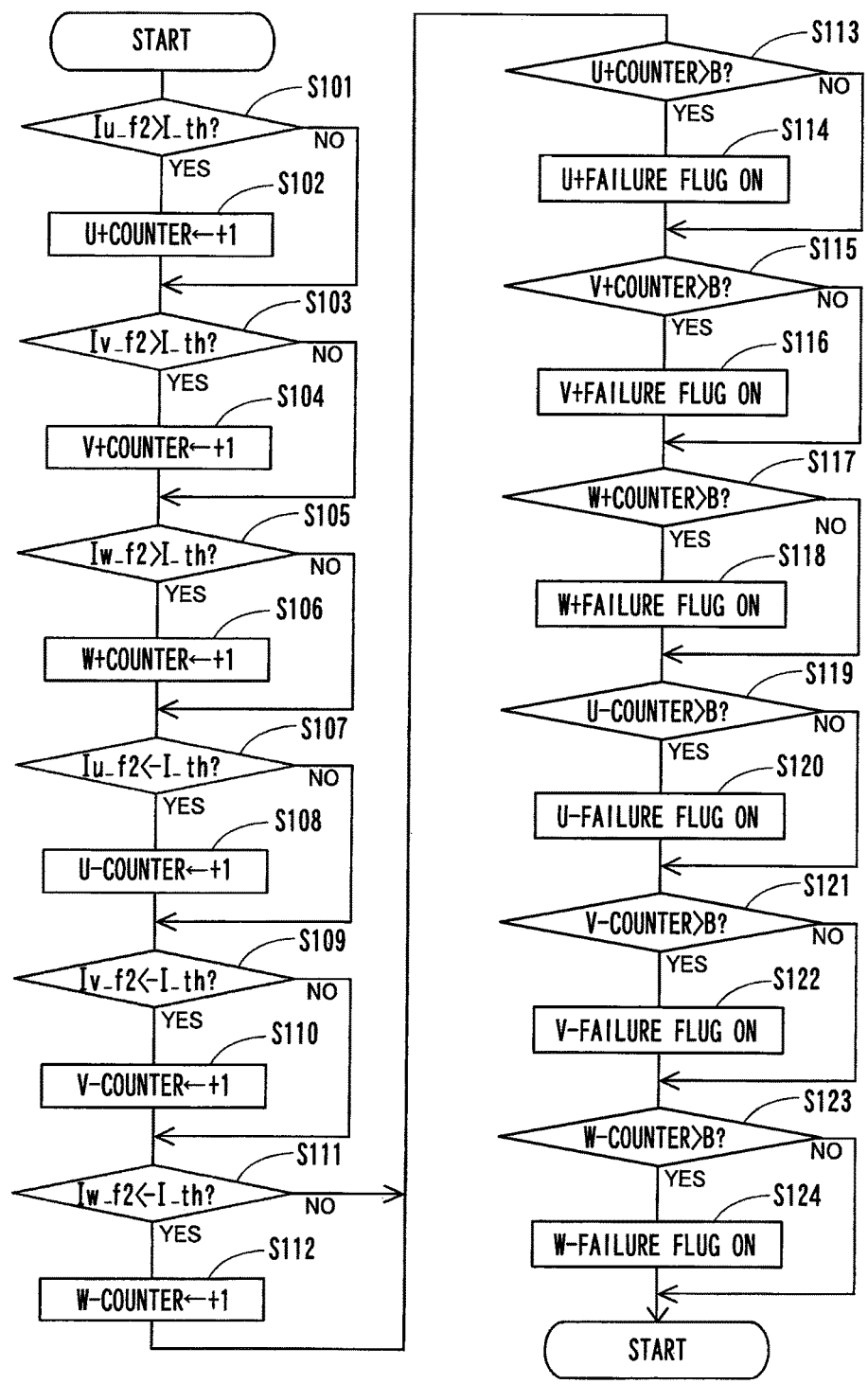
FIG. 7 is a flowchart for explaining a failure phase determination processing according to the fourth embodiment of the present disclosure.

As shown in FIG. 6, a control section 44 has a command calculating section 56, the first current estimator 61, the torque calculator 63, the second disturbance voltage estimator 71, the bandpass filter 73, the second current estimator 75, and a failure phase detector 79.

The command calculating section 56 has the three-phase to two-phase conversion section 510, the torque correcting section 511, the subtractors 512, 513, the controllers 514, 515, the dq non-interacting voltage calculating sections 516, 517, the non-interacting voltage correcting sections 518, 519, the two-phase to three-phase conversion section 520, and the disturbance voltage correcting sections 541, 542, 543.

The command calculating section 56 is similar to the command calculating section 51 of the first embodiment except in that the second disturbance voltage estimation values Vu_g2, Vv_g2, Vw_g2 are added to the voltage command values Vu*, Vv*, Vw*, to calculate the corrected voltage command values Vu, Vv, Vw**.

In the present embodiment, a place where the short circuit failure occurs is specified in the failure phase detector 79 by use of the second current estimation values Iu_f2, Iv_f2, Iw_f2 estimated in the second current estimator 75.

Failure phase determination processing in the failure phase detector 79 will be described with reference to a flowchart shown in FIG. 7. The failure phase determination processing is executed in the failure phase detector 79 in a predetermined period. It is to be noted that a calculation period for the failure phase determination processing may be the same as a calculation period of the command calculating section 56, or may be a longer period than the calculation period of the command calculating section 56.

In first Step S101 (hereinafter, "Step" is omitted and simply denoted by symbol "S"), it is determined whether or not the U-phase second current estimation value Iu_f2 is larger than a positive-side shortage determination threshold I_th. The positive-side shortage determination threshold I_th may be a predetermined value, or may be made variable such that an absolute value becomes larger with increase in number of rotation or rotational angular velocity ω of the motor 10. This also applies to a negative-side shortage determination threshold −I_th. When it is determined that the U-phase second current estimation value Iu_f2 is not larger than the positive-side shortage determination threshold I_th (S101: NO), the processing proceeds to S103. When it is determined that the U-phase second current estimation value Iu_f2 is larger than the positive-side shortage determination threshold I_th (S101: YES), the processing proceeds to S102.

In S102, a U-phase positive-side failure counter is incremented. Hereinafter, the positive-side failure counter is denoted by "+ counter" in FIG. 7.

In S103, it is determined whether or not the V-phase second current estimation value Iv_f2 is larger than the positive-side shortage determination threshold I_th. When it is determined that the V-phase second current estimation value Iv_f2 is not larger than the positive-side shortage determination threshold I_th (S103: NO), the processing proceeds to S105. When it is determined that the V-phase second current estimation value Iv_f2 is larger than the positive-side shortage determination threshold I_th (S103: YES), the processing proceeds to S104.

In S104, a V-phase positive-side failure counter is incremented.

In S105, it is determined whether or not the W-phase second current estimation value Iw_f2 is larger than the positive-side shortage determination threshold I_th. When it is determined that the W-phase second current estimation value Iw_f2 is not larger than the positive-side shortage determination threshold I_th (S105: NO), the processing proceeds to S107. When it is determined that the W-phase second current estimation value Iw_f2 is larger than the positive-side shortage determination threshold I_th (S105: YES), the processing proceeds to S106.

In S106, a W-phase positive-side failure counter is incremented.

In S107, it is determined whether or not the U-phase second current estimation value Iu_f2 is smaller than a negative-side shortage determination threshold −I_th. When it is determined that the U-phase second current estimation value Iu_f2 is not smaller than the negative-side shortage determination threshold −I_th (S107: NO), the processing proceeds to S109. When it is determined that the U-phase second current estimation value Iu_f2 is smaller than the negative-side shortage determination threshold −I_th (S107: YES), the processing proceeds to S108.

In S108, a U-phase negative-side failure counter is incremented. Hereinafter, the negative-side failure counter is denoted by "− counter" in FIG. 7.

In S109, it is determined whether or not the V-phase second current estimation value Iv_f2 is smaller than the negative-side shortage determination threshold −I_th. When it is determined that the V-phase second current estimation value Iv_f2 is not smaller than the negative-side shortage determination threshold −I_th (S109: NO), the processing proceeds to S111. When it is determined that the V-phase second current estimation value Iv_f2 is smaller than the negative-side shortage determination threshold −I_th (S109: YES), the processing proceeds to S110.

In S110, a V-phase negative-side failure counter is incremented.

In S111, it is determined whether or not the W-phase second current estimation value Iw_f2 is smaller than the negative-side shortage determination threshold −I_th. When it is determined that the W-phase second current estimation value Iw_f2 is not smaller than the negative-side shortage determination threshold −I_th (S111: NO), the processing proceeds to S113. When it is determined that the W-phase second current estimation value Iw_f2 is smaller than the negative-side shortage determination threshold −I_th (S111: YES), the processing proceeds to S112.

In S112, a W-phase negative-side failure counter is incremented.

In S113, it is determined whether or not a count value of the U-phase positive-side failure counter is larger than a determination value B. When it is determined that the count value of the U-phase positive-side failure counter is not larger than the determination value B (S113: NO), the processing proceeds to S115. When it is determined that the count value of the U-phase positive-side failure counter is larger than the determination value B (S113: YES), the processing proceeds to S114.

In S114, it is determined that the abnormality of the U2 coil 121 and the second upper-side bus 228 coming into the substantially conductive state has occurred, and a U+ failure flag FlgU+ is turned on.

In S115, it is determined whether or not a count value of the V-phase positive-side failure counter is larger than the determination value B. When it is determined that the count value of the V-phase positive-side failure counter is not larger than the determination value B (S115: NO), the processing proceeds to S117. When it is determined that the count value of the V-phase positive-side failure counter is larger than the determination value B (S115: YES), the processing proceeds to S116.

In S116, it is determined that the abnormality of the V2 coil 122 and the second upper-side bus 228 coming into the substantially conductive state has occurred, and a V+ failure flag FlgV+ is turned on.

In S117, it is determined whether or not a count value of the W-phase positive-side failure counter is larger than the determination value B. When it is determined that the count value of the W-phase positive-side failure counter is not larger than the determination value B (S117: NO), the processing proceeds to S119. When it is determined that the count value of the W-phase positive-side failure counter is larger than the determination value B (S117: YES), the processing proceeds to S118.

In S118, it is determined that the abnormality of the W2 coil 123 and the second upper-side bus 228 coming into the substantially conductive state has occurred, and a W+ failure flag FlgW+ is turned on.

In S119, it is determined whether or not a count value of the U-phase negative-side failure counter is larger than the determination value B. When it is determined that the count value of the U-phase negative-side failure counter is not larger than the determination value B (S119: NO), the processing proceeds to S121. When it is determined that the count value of the U-phase negative-side failure counter is larger than the determination value B (S119: YES), the processing proceeds to S120.

In S120, it is determined that the abnormality of the U2 coil 121 and the second lower-side bus 229 coming into the substantially conductive state has occurred, and a U− failure flag FlgU− is turned on.

In S121, it is determined whether or not a count value of the V-phase negative-side failure counter is larger than the determination value B. When it is determined that the count value of the V-phase negative-side failure counter is not larger than the determination value B (S121: NO), the processing proceeds to S123. When it is determined that the count value of the V-phase negative-side failure counter is larger than the determination value B (S121: YES), the processing proceeds to S122.

In S122, it is determined that the abnormality of the V2 coil 122 and the second lower-side bus 229 coming into the substantially conductive state has occurred, and a V− failure flag FlgV− is turned on.

In S123, it is determined whether or not a count value of the W-phase negative-side failure counter is larger than the determination value B. When it is determined that the count value of the W-phase negative-side failure counter is not larger than the determination value B (S123: NO), the processing is ended. When it is determined that the count value of the W-phase negative-side failure counter is larger than the determination value B (S123: YES), the processing proceeds to S124.

In S124, it is determined that the abnormality of the W2 coil 123 and the second lower-side bus 229 coming into the substantially conductive state has occurred, and a W− failure flag FlgW− is turned on.

Hence it is possible to appropriately specify a failure phase as a phase in which the short circuit failure has occurred, based on the second current estimation values Iu_f2, Iv_f2, Iw_f2. The failure flags FlgU+, FlgV+, FlgW+, FlgU−, FlgV−, FlgW−, which are pieces of information related to the specified failure phases, are outputted to the first current estimator 61.

In the first current estimator 61, the first current estimation values Iu_f1, Iv_f1, Iw_f2 are calculated using the information of the failure phase specified based on FlgU+, FlgV+, FlgW+, FlgU−, FlgV−, FlgW− outputted from the failure phase detector 79.

It should be noted that, when occurrence of the short circuit failure has specified and all of the failure flags FlgU+, FlgV+, FlgW+, FlgU−, FlgV−, FlgW− are off, it can be specified that this is a short circuit failure caused by signal abnormality and that the SW elements 221 to 226 themselves are normal. For example, by stopping overall control of the second system 102 side, the SW elements 221 to 226 can be turned off, and when electric connection between the coils 121 to 123 and the upper-side bus 228 or the lower-side bus 229 can be cut, conduction to the failure system by a reverse voltage does not occur. This prevents the normal system from being affected by the disturbance voltages Vu_g, Vv_g, Vw_g. In this case, the torque correction value Iq_c and the disturbance voltage estimation values Vu_g2, Vv_g2, Vw_g2 may be set to zero. Further, the command calculation in the normal system may be performed by similar processing to that in normal time.

The control section 44 of the present embodiment has the failure phase detector 79. The failure phase detector 79 specifies a failure place in the failure system based on the second current estimation values Iu_f2, Iv_f2, Iw_f2.

Hence, it is possible to appropriately specify the failure place based on the second current estimation values Iu_f2, Iv_f2, Iw_f2.

Further, a similar effect to those of the above embodiments is exerted.

In the present embodiment, the command calculating section 56 corresponds to the "command calculating device", and the failure phase detector 79 corresponds to the "failure place specifying device". The others are similar to those in the above embodiments.

(Fifth Embodiment)

A fifth embodiment of the present disclosure will be described with reference to FIG. 8.

Figure 8:
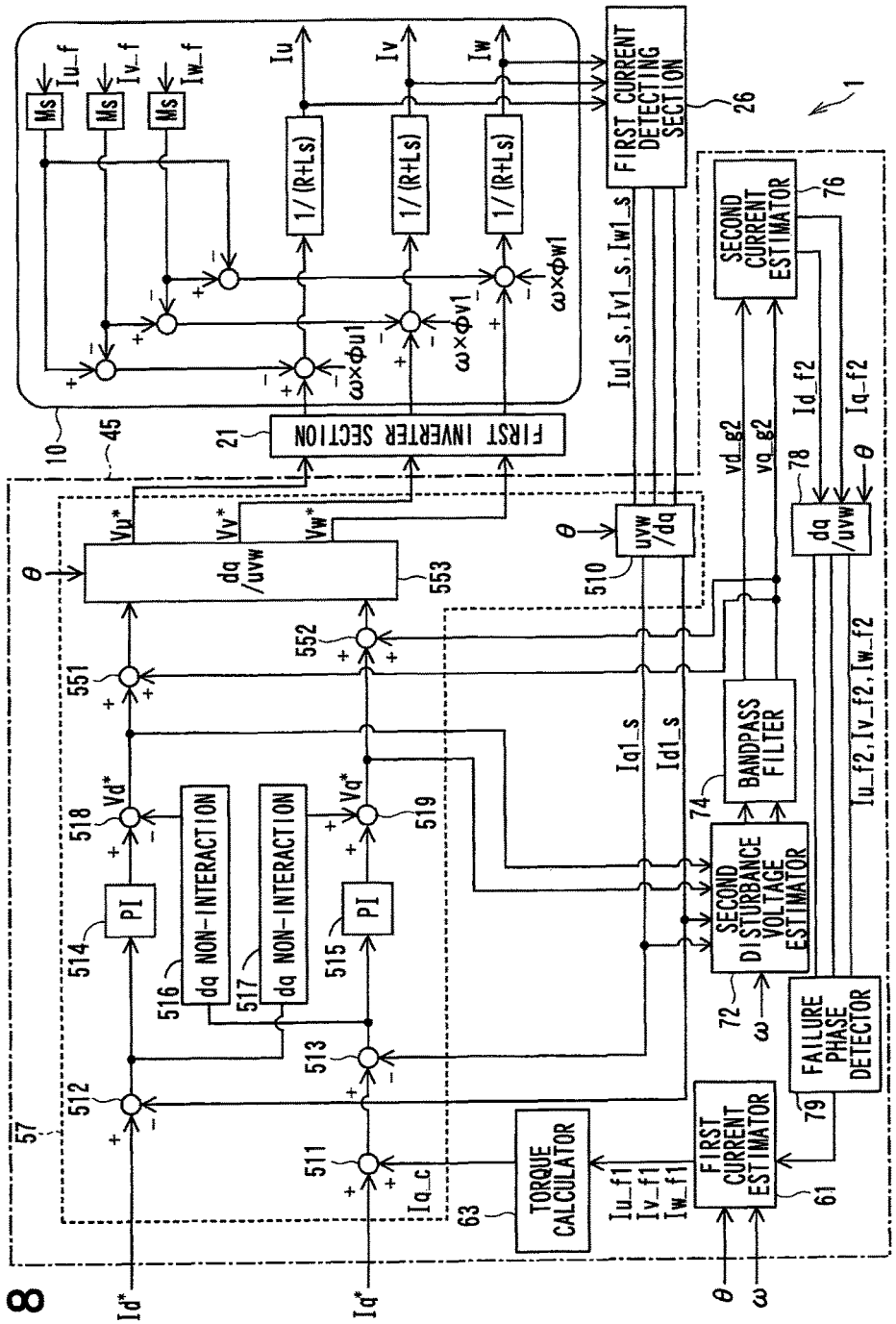
FIG. 8 is a block diagram showing a control section according to a fifth embodiment of the present disclosure.

As shown in FIG. 8, a control section 45 has a command calculating section 57, the first current estimator 61, the torque calculator 63, the second disturbance voltage estimator 72, the bandpass filter 74, the second current estimator 76, a two-phase to three-phase conversion section 78, and the failure phase detector 79.

The command calculating section 57 has the three-phase to two-phase conversion section 510, the torque correcting section 511, the subtractors 512, 513, the controllers 514, 515, the dq non-interacting voltage calculating sections 516, 517, the non-interacting voltage correcting sections 518, 519, the disturbance voltage correcting sections 551, 552, and the two-phase to three-phase conversion section 553.

In the present embodiment, similarly to the third embodiment, the second disturbance voltage estimation values Vd_g2, Vq_g2 are added to the voltage command values Vd*, Vq* in the disturbance voltage correcting sections 551, 552, to calculate corrected voltage command values Vd, Vq. Further, reverse dq conversion is performed on the corrected voltage command values Vd, Vq in the two-phase to three-phase conversion section 553, to calculate the voltage command values Vu*, Vv*, Vw*. Except for this regard, the command calculating section 57 of the present embodiment is similar to the command calculating section 51 of the first embodiment.

The two-phase to three-phase conversion section 78 performs reverse dq conversion on the d-q axis second current estimation values Id_f2, Iq_f2 calculated in the second current estimator 76, to calculate the three-phase second current estimation values Iu_f2, Iv_f2, Iw_f2. The calculated second current estimation values Iu_f2, Iv_f2, Iw_f2 are outputted to the failure phase detector 79.

In the failure phase detector 79, similarly to the fourth embodiment, a place in which the short circuit failure has occurred is specified based on the second current estimation values Iu_f2, Iv_f2, Iw_f2.

Even with such a configuration, a similar effect to those of the above embodiments is exerted.

In the present embodiment, the command calculating section 57 corresponds to the "command calculating device". The others are similar to those in the above embodiments.

(Sixth Embodiment)

Figure 9A:
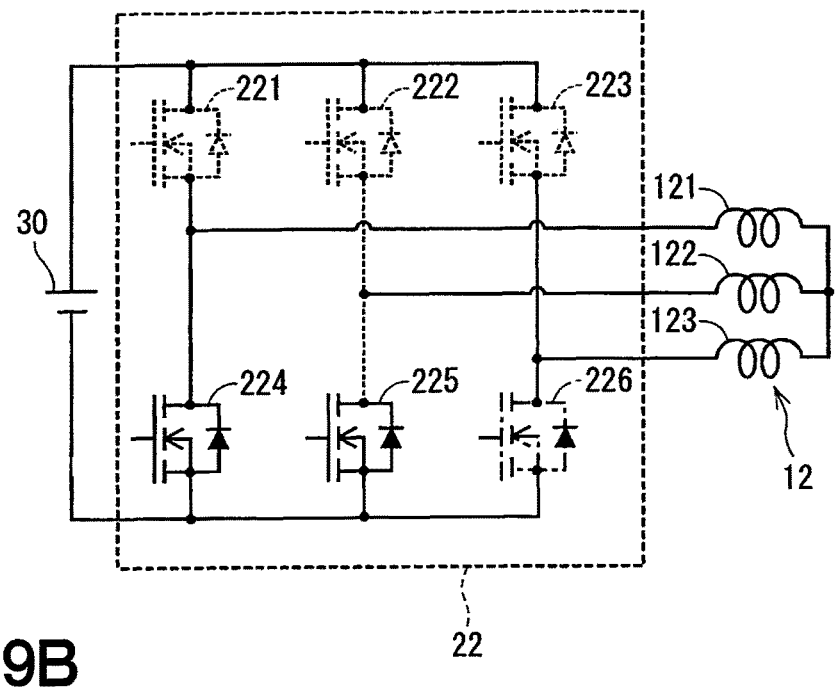
FIGS. 9A and 9B are explanatory diagrams for explaining control of an inverter section in a failure system according to a sixth embodiment of the present disclosure.
Figure 9B:
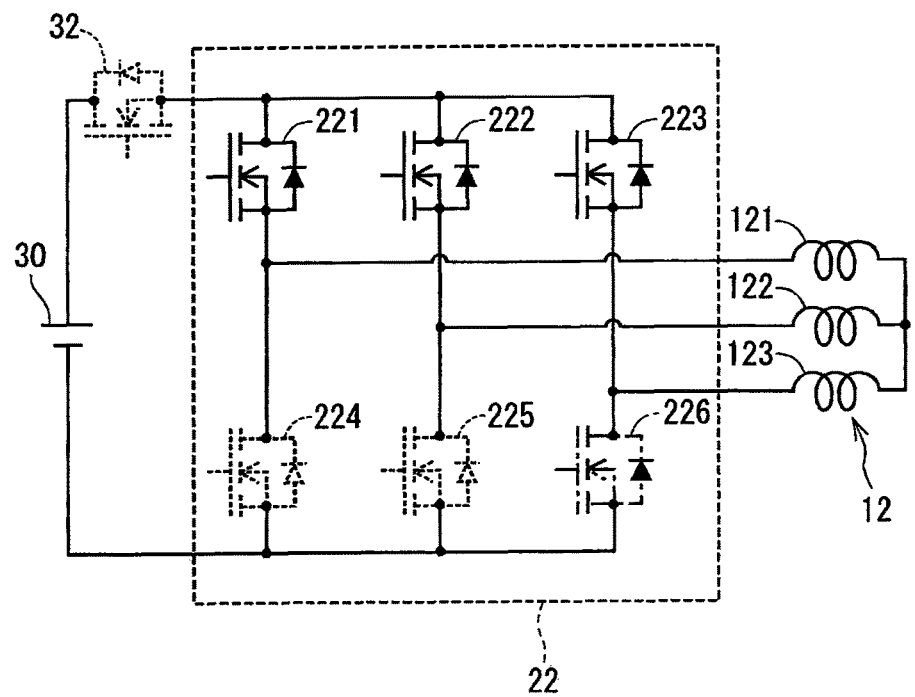

A sixth embodiment of the present disclosure will be described with reference to FIGS. 9A and 9B. In FIGS. 9A and 9B, descriptions other than those of the second winding set 12, the second inverter section 22, the battery 30, and the second power supply relay 32 have been omitted. Further, In FIG. 9A, a description of the second power supply relay 32 has also been omitted. Moreover, FIGS. 9A and 9B show examples in which the short circuit failure has occurred in the W-phase low potential-side SW element 226 indicated by dashed lines, and SW elements to be turned on are indicated by solid lines, while SW elements to be turned off are indicated by broken lines.

In the present embodiment, the control of the failure system will be described. Herein, a description will be given taking as an example a case where the control configuration of the normal system is similar to that in the first embodiment, but one of the control configurations of the second to fifth embodiments may be applied.

As shown in FIGS. 9A and 9B, with one SW element 226 being in the short circuit failure in the second inverter section 22 in the failure system, the motor 10 is driven using the first system 101, to allow the failure system currents Iu_f, Iv_f, Iw_f to flow, which then allows a pulsating current to flow in an electric primary period.

Estimating a disturbance voltage associated with the pulsating current requires the responsiveness of the disturbance voltage estimator 62 to be fast enough with respect to the pulsating current. However, the responsiveness of the disturbance voltage estimator 62 has its limits in terms of a control period and noise levels of the current detecting sections 26, 27, the rotational angle sensor 29, and the like. Hence in the present embodiment, the SW elements 221 to 226 of the second inverter section 22 in the second system 102 that is the failure system is controlled, to lower a frequency of the pulsating current.

As shown in FIG. 9A, the all-phase SW elements 224 to 226, which are connected to the same potential as that of the SW element 226 being in the short circuit failure, are turned on. It is to be noted that, when the SW element being in the short circuit failure is a high potential-side element, the all-phase high potential-side SW elements 221 to 223 are turned on.

When the all-phase SW elements 224 to 226 which are connected to the same potential side as that of the SW element 226 being in the short circuit failure are to be turned on, it is desirable to output, from the control section 41, a signal for turning on the all-phase low potential-side SW elements 224, 225, 226. Further, even when the short circuit failure having occurred is a short circuit failure of the SW element 226 itself and it has come into an on-state without outputting the signal for turning on the SW element 226, a signal for turning on the SW elements 224, 225 of the remaining two phases may be outputted. Outputting the signal for turning on the remaining two phases is to be included in the concept that "the signal generating device generates a control signal for turning on all of the high potential-side switching elements in the failure system when the short circuit failure in which the upper-side bus and any phase of the winding set come into the conductive state has occurred, or the concept that "the signal generating device generates a control signal for turning on all of the low potential-side switching elements in the failure system when the short circuit failure in which the lower-side bus and any phase of the winding set come into the conductive state has occurred".

This allows flowing of substantially sinusoidal currents in the three phases in the failure system, to make the d-axis current and the q-axis current substantially uniform. That is, current pulsation of the current is reduced.

Further, as shown in FIG. 9B, the all-phase SW elements 221 to 223, which are connected to a different potential from that of the SW element 226 being in the short circuit failure, may be turned on. It is to be noted that, when the SW element being in the short circuit failure is a high potential-side element, the all-phase low potential-side SW elements 224 to 226 are turned on.

At this time, since the upper and lower SW elements of the phase in which the short circuit failure has occurred come into the on-state, the second power supply relay 32 needs to be opened. It is to be noted that, when the all-phase SW elements on the same potential side are turned on as in FIG. 9A, the second power supply relay 32 may be in either an open or closed state.

By turning on the all-phase SW elements 221 to 223 which are connected to a different potential from that of the SW element 226 being in the short circuit failure, the resistance of each of the three phases becomes uniform, to enable more reduction in current pulsation.

As described with reference to FIGS. 9A and 9B, by performing on-control on all phases of the same potential as that of the SW element being in the short circuit failure, or all phases of a different potential therefrom, the disturbance voltages Vu_g, Vv_g, Vw_g increase as a whole, but variations in the disturbance voltages Vu_g, Vv_g, Vw_g decrease, as compared to the case of turning off all of the SW elements in the failure system. In the present embodiment, since the control for compensating the disturbance voltages Vu_g, Vv_g, Vw_g in the normal system is performed, the controllability is improved by reducing the variations in the disturbance voltages Vu_g, Vv_g, Vw_g.

In the present embodiment, when the short circuit failure in which the second upper-side bus 228 and the second winding set 12 come into the conductive state has occurred, the signal generating section 48 (see FIG. 2) generates a control signal for turning on all of the high potential-side SW elements 221 to 223 of the second inverter section 22 that is the inverter section in the failure system.

Further, when the short circuit failure in which the second lower-side bus 229 and the second winding set 12 come into the conductive state has occurred, the signal generating section 48 generates a control signal for turning on all of the low potential-side SW elements 224 to 226 of the second inverter section 22 that is the inverter section in the failure system.

This enables reduction in pulsation of the failure system currents Iu_f, Iv_f, Iw_f.

The rotating electric machine control device 1 includes the power supply relays 31, 32 which are provided between the inverter sections 21, 22 and the battery 30, and the opening and closing of which are controlled by the control section 41.

When the short circuit failure in which the second upper-side bus 228 and the second winding set 12 come into the conductive state has occurred, the signal generating section 48 turns on all of the low potential-side SW elements 214 to 216 of the second inverter section 22 that is the inverter section in the failure system.

Further, when the short circuit failure in which the second lower-side bus 229 and the second winding set 12 come into the conductive state has occurred, the signal generating section 48 turns on all of the high potential-side SW elements 211 to 213 of the second inverter section 22 that is the inverter section in the failure system.

Moreover, the control section 41 opens the second power supply relay 32 provided in the failure system.

This further enables reduction in pulsation of the failure system currents Iu_f, Iv_f, Iw_f.

(Other Embodiments)

(i) Disturbance Voltage Estimation Value, Current Estimation Value

In the above embodiments, the current estimation value, which is related to the current flowing in the failure system and estimated using the circuit equations based on the rotational angular velocity, is taken as the "first current estimation value", and the disturbance voltage estimated based on the first current estimation value is taken as the "first disturbance voltage". Further, the disturbance voltage, which is estimated using the voltage equations based on the current detection value and the voltage command value in the normal system, is taken as the "second disturbance voltage estimation value", and the current estimation value, which is related to the current flowing in the failure system and estimated based on the second disturbance voltage estimation value, is taken as the "second current estimation value". As a supplement, although the first current estimation value and the second current estimation value are obtained by estimation of similar failure system currents, the first current estimation value and the second current estimation value are discriminated by being denoted with "first" and "second" due to differences in calculation method. This also applies to the disturbance voltage estimation values.

In another embodiment, the method for estimating the failure system current and the disturbance voltage is not restricted to the calculation described in the above embodiments, but any estimation method may be used.

(ii) Command Calculating Device

In the second embodiment and the like, the current command value is corrected based on the second current estimation value in the current command value correcting section, and the voltage command value is corrected based on the second disturbance voltage estimation value in the disturbance voltage correcting section. In another embodiment, one of the voltage command value correcting section and the disturbance voltage correcting section may be omitted.

In addition, that "the command calculating device corrects the current command value based on the current estimation value (calculated based on the disturbance voltage estimation value)" is included in the concept that "the command calculating device calculates the normal system command value related to control of conduction to the normal system in accordance with the disturbance voltage estimation value". Further, that "the command calculating device corrects the current command value based on the current estimation value" can also be grasped as compensating the torque of the failure system in the normal system.

Naturally, that "the command calculating device corrects the voltage command value based on the disturbance voltage estimation value" is also included in the concept that "the command calculating device calculates the normal system command value related to conduction to the normal system in accordance with the disturbance voltage."

(iii) Current Detection Element

In the above embodiments, the current detection element is the shunt resistor, and is provided on the low potential side of the low potential-side SW element. In another embodiment, the current detection element is not restricted to the shunt resistor, but may be a hall IC or the like, for example. Further, in another embodiment, the current detection element may be provided in a place other than the low potential side of the low potential-side SW element, such as the high potential side of the high potential-side SW element, or a place between the winding set and the inverter section.

(iv) Rotating Electric Machine

In the above embodiments, two winding sets are provided, and two inverter sections and the like are provided corresponding to the winding sets. In another embodiment, the number of winding sets may be three or larger.

In the above embodiments, the first winding set and the second winding set are arranged with each of the phases thereof displaced by 30 degrees. In another embodiment, the winding sets may be arranged in any manner. Even when the windings are arranged in a different manner, it is possible to estimate the disturbance voltage and the failure system current by similar calculation, though mutual inductance between the systems appears differently.

In the above embodiments, the rotating electric machine is the three-phase brushless motor. In another embodiment, the number of phases of the rotating electric machine is not restricted to three, but may be four or larger. Further, it is not restricted to the brushless motor, but may be any motor. Moreover, the rotating electric machine is not restricted to the motor, but may be a generator, or a so-called motor generator which has combined functions of the motor and the generator.

In the above embodiments, the rotating electric machine is applied to the electric power steering device. In another embodiment, the rotating electric machine control device may be applied to a device other than the electric power steering device.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A rotating electric machine control device for controlling a drive of a rotating electric machine having a plurality of winding sets which are magnetically coupled with each other, the rotating electric machine control device comprising:
    an inverter arranged in each of the winding sets and having a high potential-side switching element corresponding to each phase of a respective winding set, and a low potential-side switching element connected to a low potential side of the high potential-side switching element; and
    a controller controlling the inverter in each of the winding sets, wherein:
    each of the winding sets and the inverter corresponding to a respective winding set provide a system;
    the controller has:
        a signal generator generating a control signal for controlling on and off operations of each of the high potential-side switching elements and the low potential-side switching elements;
        a disturbance voltage estimating device calculating a disturbance voltage estimation value, which is an estimated disturbance voltage generated in a normal system where a short circuit failure does not occur, the disturbance voltage estimation value determined by calculating a current estimation value which is obtained by estimating a current flowing in a failure system when the short circuit failure occurs in the failure system; and
        a command calculating device calculating a normal system command value, related to a control of energization to the normal system, in accordance with the disturbance voltage estimation value;
    an upper-side bus connects high potential sides of high potential-side switching elements in each of the winding sets;
    a lower-side bus connects low potential sides of low potential-side switching elements in each of the winding sets; and
    the short circuit failure is defined as a failure, in which the upper-side bus or the lower-side bus is electrically connected to one phase of a respective winding set.

2. The rotating electric machine control device according to claim 1, wherein:
    a voltage command value is calculated based on a current command value of the rotating electric machine and a current detection value of each phase in the normal system; and
    the voltage command value is corrected using the disturbance voltage estimation value to calculate the normal system command value.

3. The rotating electric machine control device according to claim 1, wherein:
    the current estimation value is calculated based on a rotational angular velocity of the rotating electric machine.

4. The rotating electric machine control device according to claim 1, wherein:
    the controller includes a current estimating device for calculating the current estimation value based on a second disturbance voltage estimation value;
    the second disturbance voltage estimation value is calculated based on the current detection value of each phase in the normal system and a voltage command value; and
    the voltage command value is calculated based on the current command value of the rotating electric machine and the current detection value.

5. The rotating electric machine control device according to claim 4, wherein:
    the command calculating device calculates the normal system command value based on a corrected current command value, which is obtained by correcting the current command value using the current estimation value.

6. The rotating electric machine control device according to claim 4, wherein:
    the controller further includes a failure place specifying device for specifying a failure place in the failure system based on the current estimation value.

7. The rotating electric machine control device according to claim 1, wherein:
    the signal generating device generates the control signal for turning off all of the high potential-side switching elements and the low potential-side switching elements of the inverter in the failure system when the short circuit failure occurs.

8. The rotating electric machine control device according to claim 1, wherein:
    the signal generating device generates the control signal for turning on all of the high potential-side switching elements in the failure system when the short circuit failure, in which the upper-side bus is electrically connected to one phase of a respective winding set, occurs; and the signal generating device generates the control signal for turning on all of the low potential-side switching elements in the failure system when the short circuit failure, in which the lower-side bus is electrically connected to one phase of a respective winding set, occurs.

9. The rotating electric machine control device according to claim 1, further comprising:
a power supply relay arranged between the inverter and a battery, and controlled to open and close by the controller, wherein:
the signal generating device generates the control signal for turning on all of the low potential-side switching elements in the failure system when the short circuit failure, in which the upper-side bus is electrically connected to one phase of a respective winding set, occurs;
the signal generating device generates the control signal for turning on all of the high potential-side switching elements in the failure system when the short circuit failure, in which the lower-side bus is electrically connected to one phase of a respective winding set, occurs; and
the controller controls the power supply relay in the failure system to open.

* * * * *